United States Patent [19]

Leyland et al.

[11] Patent Number: 5,336,294
[45] Date of Patent: Aug. 9, 1994

[54] REMOVAL OF CONTAMINANTS FROM MOLTEN METALS

[75] Inventors: Steven P. Leyland; David A. Ford, both of Bristol, England

[73] Assignee: Rolls-Royce plc, London, England

[21] Appl. No.: 91,300

[22] Filed: Jul. 15, 1993

[30] Foreign Application Priority Data

Jul. 30, 1992 [GB] United Kingdom ............... 9216227

[51] Int. Cl.⁵ ............................................. C22B 9/02
[52] U.S. Cl. ....................................... 75/406; 75/407; 75/412; 75/628; 75/678
[58] Field of Search ............... 75/412, 407, 406, 678, 75/628

[56] References Cited

U.S. PATENT DOCUMENTS 3,869,282  3/1975  Curran et al. ..................... 75/407
4,690,763  9/1987  Rieger et al. .
4,789,140  12/1988  Lirones ............................ 75/407
4,921,616  5/1990  Minjolle .

FOREIGN PATENT DOCUMENTS 358361      3/1990   European Pat. Off. .
2718332     11/1977  Fed. Rep. of Germany .
1064237     5/1967   United Kingdom .
1277716     6/1972   United Kingdom .
WO87/02069  4/1987   World Int. Prop. O. .

Primary Examiner—Melvyn J. Andrews
Attorney, Agent, or Firm—Oliff & Berridge

[57] ABSTRACT

Particles or inclusions are removed from a molten alloy by contacting the molten alloy with a material selected from the group consisting of aluminium silicate, magnesium silicate, zirconium oxide or a mixture of alumina-calcia and alumina-magnesia.

6 Claims, No Drawings

REMOVAL OF CONTAMINANTS FROM MOLTEN METALS

This invention concerns improvements in or relating to the removal of containments from molten metals. "Molten metals" will be understood to include molten alloys such as aluminum alloys and nickel-base superalloys, as well as molten elemental metals. The invention particularly concerns the filtration of such molten metals used in the manufacture of aero engine components.

In many casting applications, particularly those used in the aero engine industry there is a demand for components produced from alloys having ultra-high purity, that is, not only with a substantially zero content of soluble contaminants but also having a virtually zero non-alloy particle or inclusion content. It is recognised that the presence of particles or inclusions in aero engine components is extremely undesirable in that contamination by minute particles can cause weaknesses in the crystalline structure of the metal alloy of which the components are made and can make the casting process of large single-crystal structures very difficult. Although good melting practice can minimise inclusion entrapment it is virtually impossible to guarantee that inclusions such as crucible ceramic particles or surface oxide skins are not entrapped when metal alloys are melted or poured during the casting process, and consequently filtration of the molten metal is needed to ensure the removal of such inclusions.

Hitherto, particles or inclusions have been filtered from the molten metal in two ways, both essentially mechanical and both operable at high temperatures. The first way uses filters which have extremely small channels as provided by stacks of filter elements or by a block of foam material. Because of the surface tension effects caused by the minute channels filtration by this means is both slow and expensive in that the metal has to be maintained in the molten state for a relatively long time, and high pressure has to be applied to overcome the surface tension effects. The second method employs the passage of molten metal through a labyrinth filter so that, it is believed, sudden and frequent changes in momentum cause the suspended particles to lose energy and drop out of suspension. This also is relatively slow and expensive. Both ways of filtering typically take considerable time to enable a molten metal of an acceptable degree of purity to be produced.

It is clear that the strength of a filter is of importance, since the density and velocity of the molten metal may damage the filter whilst a filtration step is in progress and this may result in added contamination of the molten metal. However, strong filter elements are not necessarily the best materials to draw out the particles from the molten metal and it has been found that filtration efficiency is highly dependent upon the elements present in the molten metal and thus upon relative surface effects of the molten metal upon the filter materials. It has also been found that when contaminant particles or inclusions contact another surface such as the wall of a filter the particles can become attached and bond themselves to that surface, depending on the material of which the surface is composed. Molten metal flow can be manipulated so that particles to be removed are brought into contact with the filter wall surface or other surface such as a paddle used to stir molten metal in a crucible, and the particles are subsequently captured by that surface. When the metal being cast is a nickel-based super alloy such as UD 720 (of composition Ni 56.1, Cr 17.7, Co 14.0, Ti 4.80, Mo 3.30, Al 2.50, W 1.30, C 0.04, Fe 0.16, Si 0.2 by weight %) or an aluminium alloy it is preferable to coat the contact surface with a ceramic material and examples of such coatings are mullite or aluminium silicate ($3Al_2O_3\,2SiO_2$), magnesium silicate ($MgO\,SiO_2$), a mixture of alumina-calcia and alumina-magnesia (50% $Al_2O_3\,CaO$ and 50% $Al_2O_3\,MgO$) and zirconium oxide ($ZrO_2$).

It is an object of the present invention to provide a method of removing particles or inclusions from a molten metal such as aluminium alloy or a nickel-base superalloy which method is both effective, quick and inexpensive.

Contaminants commonly found in aluminium alloys and nickel-base super alloys such as UD 720 are alumina, zirconia and other oxide particles and it is a further object of the present invention to remove these contaminants from such alloys when in the molten state. In its most general form the invention removes solid contaminants from a molten metal by contacting the metal with a surface comprising a silicate or oxide of a metal of groups IIa; IIIb or IVa of the periodic table.

According to the present invention there is provided a method of removing from a molten metal an oxide selected from the group consisting of alumina and zirconia, the method comprising contacting the molten metal with a material selected from the group consisting of aluminium silicate, magnesium silicate, zirconium oxide or a mixture of equal quantities of alumina-calcia and alumina-magnesia.

Preferably the material for contacting the molten metal is in the form of a coating on a surface with which the molten metal comes into contact. The surface may be a portion of a paddle used to stir the molten metal. Alternatively the material may be in the form of a ceramic gel coating on the surface of a conventional filter for molten metal.

In a first example of the invention a molten aluminium alloy containing particles of alumina was stirred with a paddle made of mullite ($3Al_2O_3\,2SiO_2$) which is a naturally occurring of aluminum silicate. It was found that the particles of alumina in the molten alloy adhered to the paddle almost immediately leaving the molten metal substantially free of alumina particles.

In a second example of the invention a crucible of alumina ceramic material was diffused into a suspension of mullite ($3Al_2O_3\,2SiO_2$) and then removed and dried at 100° C. to convert the liquid layer to a gel. After further heating to 500° C. a second application was made. The crucible was then fired at 1000° C. A crucible so treated was found to remove alumina and zirconia contaminants from the molten metal alloy contained therein.

In a third example of the invention a standard filter for filtering molten metals was coated with a ceramic gel containing aluminum silicate as in the second example described above and then used to filter a molten aluminum alloy containing alumina and zirconia particle contaminants. These particles were found afterwards to have adhered to the filter and the molten alloy was substantially free of alumina and zirconia particles. A series of filter elements may be stacked one upon another with each filter element coated with a particular coating designed to remove a specific particle from the molten metal.

We claim:

1. A method of removing from a molten metal an oxide selected from the group consisting of alumina and zirconia, the method comprising the steps of:
   (a) preparing a suspension of a material selected from the group consisting of aluminum silicate, magnesium silicate, zirconium oxide and a mixture of equal parts of alumina-calcia and alumina-magnesia,
   (b) coating a surface of a ceramic material with the suspension,
   (c) drying the coated surface at about 100° C. to convert the coating of suspension to a gel,
   (d) heating the ceramic surface to about 500° C.,
   (e) applying a further coating of the suspension to the ceramic surface,
   (f) firing the surface at about 1000° C., and
   (g) contacting the molten metal with the fired ceramic surface whereby said oxide adheres to the ceramic surface.

2. A method as claimed in claim 1 wherein the aluminum silicate is mullite.

3. A method as claimed in claim 1 wherein the ceramic surface is a surface of the a casting crucible.

4. A method as claimed in claim 1 wherein the ceramic surface is a surface of a ceramic filter.

5. A method as claimed in claim 1 wherein the molten metal is a nickel-base alloy.

6. A method as claimed in claim 1 wherein the molten metal is an aluminium alloy.

* * * * *